Figure 2:
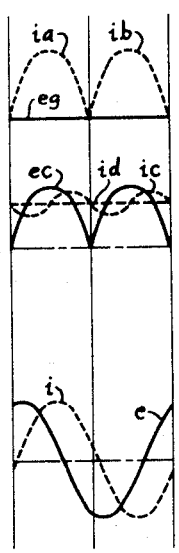

Oct. 31, 1950     L. STANTON     2,528,017

ANTIHUNTING ELECTRONIC MOTOR DRIVE APPARATUS

Filed June 18, 1949

INVENTOR.
LEONARD STANTON

BY Arthur H. Levenson

ATTORNEY.

Patented Oct. 31, 1950  2,528,017

UNITED STATES PATENT OFFICE 2,528,017

ANTIHUNTING ELECTRONIC MOTOR DRIVE APPARATUS

Leonard Stanton, Philadelphia, Pa., assignor to Minneapolis-Honeywell Regulator Company, Minneapolis, Minn., a corporation of Delaware Application June 18, 1949, Serial No. 99,930

7 Claims. (Cl. 318—28)

1

The present invention relates to motor control apparatus of the known type including a motor having motor energizing circuit means connected to the output circuits of two electronic motor drive valves, each including an anode, a cathode, and a control grid, and an electronic amplifier connected to the control grids of said valves and operating to make one of said valves more or less conductive than the other in response to the departure in one direction or the other from a normal or zero value of a control signal amplified in said apparatus.

The general object of the present invention is to provide new and improved means for damping the motor as said control signal attains its normal value. More specifically stated, the general object of the present invention is to provide a motor control system of the general type specified, with means for momentarily injecting a feed back damping voltage into the amplifier in response to the increase in current flow in a resistor included in the common portion of the output circuits of the motor drive valves which occurs as the control signal attains its normal value.

While not restricted to such use, the present invention relates to self-balancing measuring and control apparatus of the well known and widely used type disclosed and claimed in the Wills Patent No. 2,423,540 granted July 8, 1947. That apparatus comprises a normally balanced measuring and control circuit network which is unbalanced by changes in the quantity measured and which is automatically rebalanced by a reversible electric motor. The operation of the motor is controlled by an electronic voltage and power amplifying system responsive to unbalance of said network.

The above mentioned apparatus includes means for converting a direct current signal created by measuring circuit unbalance into an alternating current signal of one phase or of the opposite phase according to the direction of unbalance. Said electronic system amplifies the alternating current signal and derives therefrom a motor drive current which varies in magnitude with the extent of network unbalance and is of one phase or the opposite phase, depending on the direction of network unbalance. The motor comprises a control winding through which the motor drive current is passed, and comprises a power winding supplied with current of the same frequency as the alternating current amplified and so phased as to lead or lag the motor drive current by approximately 90°, accordingly as the

2 unbalance is in one direction or the other. In practice, the electronic system and the power winding are energized by alternating current supplied by a common source, at a frequency which ordinarily is, and is hereinafter assumed to be, 60 cycles per second. The motor shown in the Wills patent is of the rotary field type and comprises a rotor rotated in one direction or the other by the rotating magnetic field created by the phase displaced currents which flow through the control and power windings of the motor.

The control winding of the reversible motor of said prior patent is connected in a common output circuit portion of the two triode valves which have their anodes connected to the opposite ends of a secondary winding of a transformer and which have their cathodes connected through the control winding to said secondary winding at a point midway between its two ends. The control signal amplified in the voltage amplifying section of the electronic system is impressed on the control grids of the two triode valves. When the measuring circuit is substantially unbalanced, one or the other of the two triodes is made conductive during one half of each cycle, while the other triode is non-conductive throughout each cycle. Which triode is made conductive depends, of course, upon the phase of the control signal and hence upon the direction in which the measuring circuit is unbalanced. When the system is balanced and no control signal is impressed on the motor drive triodes, each triode is conductive during each half cycle in which its anode is positive relative to its cathode.

The character of the current flowing through the control winding varies with the conditions of operation. Thus, when the measuring circuit is balanced, the current flowing through the control winding includes no 60 cycle component but does include a 120 cycle component and a direct current component during each half of each supply voltage cycle. When the measuring circuit is slightly unbalanced, the 120 cycle component appears during one half, a relatively small 60 cycle component appears during the other half, and a direct current component appears during each half of each supply voltage cycle. When the unbalance of the measuring circuit is substantial, no 120 cycle current is included in the current passing through the control winding, but that current includes a direct current component and a relatively large 60 cycle component during each half of each supply voltage cycle. While the control winding current includes a direct current component at all times, that component is smaller when the unbalance is substantial than when the unbalance is slight, and rapidly increases as balance is attained.

The direct current and 120 cycle components of the current flowing through the control winding, when the measuring circuit is balanced or only slightly unbalanced, have no motor operating tendency, and while they subject the motor to a damping action, that action is insufficient to arrest the motor movement, when balance is attained, as promptly as is desirable in many uses of the apparatus.

I have discovered, however, that it is practically feasible and desirable to utilize the current flowing through the control winding, as balance is attained, to produce a damping voltage which can be readily amplified and fed back into the main voltage amplifying system so as to provide a damping effect of ample magnitude. In producing my novel damping action, I take advantage of the fact that the total current flow through the common output circuit of the two motor drive valves, when balance is attained, is not only substantially larger than when the measuring apparatus is unbalanced, but is rapidly increasing as balance is approached. In the preferred form of the present invention, I utilize the relatively large current flow through the motor drive valve output circuit, as balance is attained, to develop rapidly a relatively large potential drop in a portion of said circuit, and use that voltage drop to energize the feed back means through which I rapidly attenuate the normal motor drive signal undergoing amplification as balance is attained.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described a preferred embodiment of the invention.

Figure 1:
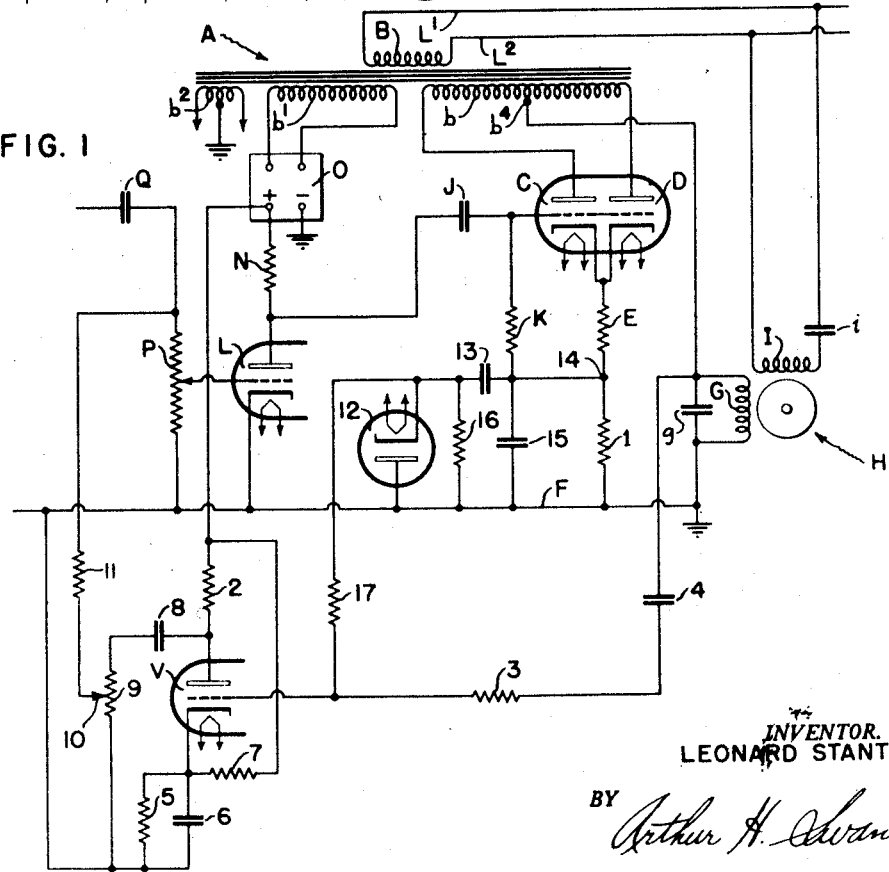

Of the drawings, Fig. 1 is a diagram illustrating one use of the present invention; and Figs. 2, 3, 4, 5 and 6 are curves showing motor winding and motor drive triode voltages and currents under different operating conditions.

In Fig. 1, a transformer A supplies energizing current to measuring and control apparatus of the type shown in said prior Wills patent. As diagrammatically shown, the transformer A comprises a primary winding B having its terminals connected to alternating current supply conductors L' and L² adapted to supply alternating current of conventional frequency and voltage; for example, 60 cycles per second and 115 volts. The transformer A includes 3 secondary windings $b$, $b'$ and $b^2$. The secondary winding $b$ has one end terminal connected to the anode of a triode C and has its other end terminal connected to the anode of a second triode D. The triodes C and D may well be the two triodes included in a twin tube of the commercially available 7N7 type. The cathodes of the triode valves C and D are connected through resistors E and I to a grounded conductor F. The latter is connected through the control winding G of a motor H to the midpoint of the secondary winding $b$ through a center tap $b^4$. A condenser $g$ in parallel with the winding G cooperates with the latter to form a parallel resonant circuit. The power winding I of motor H is connected across the supply conductors L' and L² in series with a condenser $i$ to form a series resonant circuit. The motor H is of conventional rotary field type, and the control winding G and power winding I cooperate to create a motor field which rotates in one direction or in the opposite direction, depending upon the phase of the signal impressed on the control grids of the valves C and D.

As shown in Fig. 1, the control grids of the valves C and D are directly connected to one another and are coupled through a condenser J to the output circuit of a triode L which may be of the commercially available 7F7 type. The triode valve L may be assumed to be the third stage amplifier valve of a three stage voltage amplifier of the character illustrated in the aforementioned Wills patent. The anode of the valve L is connected through an anode resistor N to the positive output terminal of a rectifier O which rectifies the output current of the transformer secondary winding $b'$. The cathode of the valve L is connected to the grounded conductor F. The control grid of the valve L is connected to a slide wire resistor P through a slider contact movable along the resistor P. The resistor P has one end connected to the conductor F, and has its other end connected to one terminal of a condenser Q through which the control grid of the third stage valve L may be connected to the output circuit of the second stage valve of the three stage voltage amplifier shown in part in Fig. 1. The transformer secondary winding $b^2$ energizes the cathode heaters of the valves included in the apparatus shown in Fig. 1. The winding $b^2$ is also intended to serve as the source of energizing current for a vibrator, like that disclosed in the aforementioned Wills patent, for use in converting the direct current produced in the measuring circuit, when the latter is unbalanced, into alternating current for amplification in the voltage amplifier of which the valve L forms a part.

The apparatus shown in Fig. 1, and hereinbefore described in detail, does not differ significantly from the apparatus disclosed in the aforementioned Wills patent, except that the resistor I is inserted between the resistor E and ground to provide a source of control voltage, as will be explained hereinafter.

Characteristic voltages and currents in the valves C and D and in the power and control windings I and G of the rebalancing motor H under different operating conditions are shown by the curves of Figs. 2, 3, 4, 5 and 6. Those curves show voltages and currents plotted along a time axis as follows:

Curves $ia$ show the anode current of the triode C;

Curves $ib$ show the anode current of the triode D;

Curves $eg$ show the grid-cathode voltage for the triodes C and D;

Curves $ec$ show the voltage across the motor control winding G;

Curves $ic$ show the alternating component of current in the motor control winding G;

Curves $id$ show the direct component of current in the motor control winding G;

Curves $e$ show the voltage across the motor power winding I; and

Curves $i$ show the current in the motor power winding I.

Figure 3:
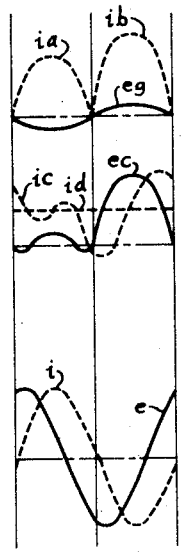
Figure 4:
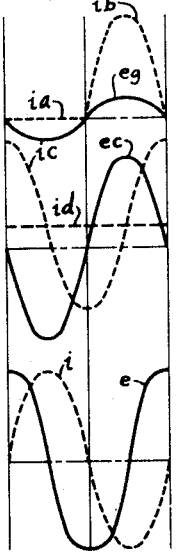
Figure 5:
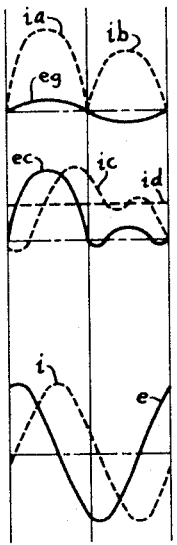
Figure 6:
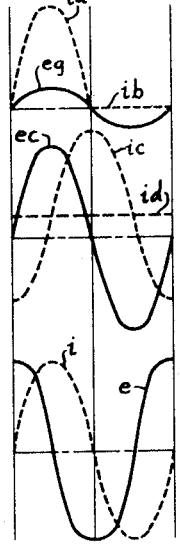

The above curves are shown for the following operating conditions of the system:

Fig. 2—Balanced system;
Fig. 3—Small temperature increase;
Fig. 4—Large temperature increase;

Fig. 5—Small temperature decrease; and
Fig. 6—Large temperature decrease.

In large part, the curves shown in Figs. 2–6 are believed to be self explanatory when considered in the light of the legends associated with the curves. Since the condenser $i$ causes the voltage $e$ across the motor power winding I to lead the voltage between the supply conductors L' and L² by approximately 90°, the power winding current, shown by the curve $i$, lags the voltage $e$ by approximately 90°, as shown. The curves $e$ and $i$ vary in amplitude from their minimum values, shown in Fig. 2, which exist when the measuring system is balanced and when the motor H is at rest, progressively increasing as the motor speed increases regardless of the direction of motor rotation, as shown in Figs. 3 to 6, inclusive.

The curves $eg$, showing the control grid-cathode voltage for the valves C and D, illustrate the fact that when the system is balanced, the grid voltage is zero, and that when the system is unbalanced, the grid voltage $eg$ is an alternating voltage of a magnitude increasing with the extent of unbalance. The curves $eg$ also show that the voltage $eg$ is in phase with, or is 180° out of phase with, the supply voltage, accordingly as the unbalance of the measuring circuit is in one direction or the other. This phase relationship can be seen by comparing the curves $eg$ with the curves $i$, since the current $i$ is substantially in phase with the supply voltage.

The curves $ia$ and $ib$ are illustrative of the fact that the valves C and D can be conductive only during the alternating periods in which their respective anodes are positive, and of the further fact that the conductivity of either valve, when its anode is positive, depends upon the grid-cathode potential of the valve. In the balanced condition of Fig. 2, the anode currents of the two valves have the same value. When the measuring circuit unbalance increases in one direction, the current $ia$ decreases and the current $ib$ increases. When that unbalance is sufficiently large, the current $ia$ diminishes to zero. Conversely, upon measuring circuit unbalance in the opposite direction, the current $ia$ increases and the current $ib$ decreases, and the latter attains its zero value when the unbalance is relatively large.

The voltage and alternating current curves $ec$ and $ic$ respectively, for the motor control winding G are plainly illustrative of the fact that in the balanced condition of the apparatus the frequencies of the voltage and current in the control winding are double the supply voltage frequency. Those voltage and current frequencies are each equal to the supply voltage frequency when the measuring circuit unbalance is relatively great so that the motor operates at relatively high speed. When the measuring circuit unbalance is relatively small, the control winding voltage $ec$ and the alternating current component $ic$ each includes both an alternating 60 cycle component and an alternating double frequency or 120 cycle component. Those 60 cycle voltage and current components are each confined wholly or mostly to the half cycle in which the valve D is the more conductive, when the unbalance is in one direction, and are confined wholly or mostly to the other half cycle when the unbalance is in the other direction and the valve C is more conductive than the valve D.

For the operation of the present invention, the current flowing through the dropping resistor I, as balance is attained at the end of each rebalancing operation, is of primary importance. As is hereinafter explained, the resultant rapid increase in the positive potential, relative to ground, of the upper end of the resistor I causes the injection into the input circuit of the valve L of a feed back signal which produces a desirable and effective motor damping action. As is apparent from a comparison of the values of the direct current component $id$ shown in Figs. 2–6, that current component is about twice as great in the balanced condition of the apparatus as it is under either condition in which the motor H operates at full speed. Furthermore, a comparison of Fig. 2 with Fig. 3 or with Fig. 5 shows a substantial difference between the value of the current $id$ when there is no unbalance, and when the unbalance is small.

In accordance with the present invention, I combine with the previously described apparatus a triode valve V which may be of the commercially avalable 7F7 or 7N7 type. The anode of the valve V is connected through an anode resistor 2 to the positive output terminal of the rectifier O. The control grid of the valve V is connected to the center tap connection $b^4$ of the winding $b$ through a resistor 3 and a condenser 4 connected in series therewith. The cathode of the valve V is connected to the grounded conductor F through a cathode resistor 5 and a condenser 6 connected in parallel therewith. The cathode of the valve V is also connected through a resistor 7 to the positive output terminal of the rectifier O. The valve V is normally biased to cutoff by the cathode circuit network including resistors 5 and 7. The anode of the valve V is connected to the grounded conductor F by a condenser 8 and a resistor 9 connected in series in the order stated. Engaging the resistor 9 is a slider contact 10 which is connected through a resistor 11 to the connected terminals of the resistor P and condenser Q.

The control grids of the valves C and D are connected through a grid resistor K to a junction 14 between the resistors E and I. The anode of a diode 12 is connected to the grounded conductor F, and the cathode of the diode is connected through a condenser 13 to the junction 14. The junction 14 is also connected to the grounded conductor F by a condenser 15 which thus by-pass the resistor I. The cathode of the diode 12 is connected to the grounded conductor F by a resistor 16, and is connected to the control grid of the valve V buy a resistor 17. The diode 12 may be a triode connected for operation as a diode and forming one of the two valves in the type 7F7 or 7N7 twin tube including the valve V.

In the intended operation of the apparatus shown in Fig. 1, the resistor I serves as a dropping resistor by-passed by the condenser 15. The direct current flowing through either or both the valves C and D produces a voltage drop across the resistor I which sharply increases and makes the potential of the junction 14 significantly positive relative to the grounded conductor F as balance is approached in each rebalancing operation. The condenser 13 and resistor 16 constitute a differentiating network in the grid circuit of the triode V. This network delivers a sharp positive pulse to the control grid of the valve V as balance is approached. Although the valve V is normally biased to cutoff by its cathode circuit resistor network including the resistors 5 and 7, said sharp positive pulse makes the valve V momentarily conductive so that the latter transmits a signal through the condenser 8 and resistor 9, 11, and P to the control grid of the valve L. The position of the slider contact 10 along the length of the resistor 9 can be chosen so that the feed back signal applied to the control grid of the valve L will have a suitable magnitude. The signal thus injected into the motor drive signal amplifying system is of such polarity and is so timed as to greatly attenuate the drive signal and thus subject the motor H to a relatively strong damping effect at the instant at which balance is attained and the damping effect is most needed.

When the apparatus shown in Fig. 1 is suddenly unbalanced with a corresponding, sudden development of a relatively large control signal and energization of the control winding G, the positive potential of the junction 14 relative to ground is sharply reduced. A negative pulse would then be fed to the control grid of the valve V if the diode valve 12 were not included in the circuit as shown in Fig. 1. Such a negative pulse might swing the control grid of the valve V so far negative that the feed back system would not operate properly when balance was next approached. The diode 12 prevents this by preventing the formation of negative pulses as a result of sudden decreases in the positive voltage of the junction 14. However, the diode 12 does not significantly restrict positive pulses produced by increases in the voltage of the junction 14.

The values of the circuit components shown alike in Fig. 1 and in said prior Patent 2,423,540 may be those customarily employed in the commercial use of the apparatus of said patent. Suitable and suitably related values for the circuit components shown in Fig. 1 and not included in the apparatus shown in said prior patent are as follows:

| Component | Unit | Value |
|---|---|---|
| Resistor 1 | ohms | 1,000 |
| Resistor 2 | megohm | 1 |
| Resistor 3 | do | 0.5 |
| Resistor 5 | ohms | 5,000 |
| Resistor 7 | megohm | 0.25 |
| Resistor 9 | do | 1 |
| Resistor 11 | do | 0.5 |
| Resistor 16 | do | 1 |
| Resistor 17 | do | 0.5 |
| Condenser 4 | microfarad | 0.01 |
| Condenser 6 | microfarads | 10 |
| Condenser 8 | microfarad | 0.05 |
| Condenser 13 | do | 0.1 |
| Condenser 15 | microfarads | 10 |

Although the invention disclosed herein is especially well adapted for use in apparatus of the character disclosed in said prior Patent 2,423,540, the invention is also well adapted for use in any other motor control system including a reversible motor having an energizing winding connected to the output circuits of two motor drive valves, each of which includes an anode, a cathode, and a control grid, and wherein one of said valves is made more or less conductive than the other in response to the variation in direction and magnitude of a control signal amplified in a voltage amplifier which controls bias voltages impressed on the control grids of the motor drive valves.

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. In motor control apparatus of the type comprising a pair of motor drive valves, each of which has an anode, a cathode, a control grid, and an output circuit including the anode and cathode of the valve, the output circuits of the two valves including separate current supply connections to the anodes of the two valves and a common portion connected to the cathodes of the two valves, a motor, motor energizing circuit means connected to the output circuits of said valves for operation of said motor in one direction or in the opposite direction when the anode current of one of said valves is respectively larger or smaller than the anode current of the other valve, and an electronic voltage amplifier for amplifying a control signal and having an output circuit connected to the control grids of the two valves and operating to make one valve more or less conductive than the other when the value of the control signal differs in one sense or in the opposite sense from a normal value thereof, the two valves being similarly conductive when said control signal is of normal value, the improvement comprising a potential dropping resistor included in the common portion of the output circuits of the two valves and across which a maximum potential drop is attained when the two valves become similarly conductive, an electronic damping valve normally biased to cutoff comprising an anode, a cathode, and a control grid and having an input circuit and an output circuit including the anode and cathode of the damping valve, a feed back connection from the output circuit of said amplifier to the input circuit of said damping valve, a connection from the damping valve output circuit to said amplifier, and a potential pulse generating circuit connected between the control grid of said damping valve and said resistor and operating in response to the increase in potential drop across said resistor to make said damping valve momentarily conductive as the control signal attains its normal value and the two motor drive valves become similarly conductive.

2. Apparatus, as specified in claim 1, in which the anode voltage supplied to each of the motor drive valves is an alternating current voltage similar in frequency, but opposite in phase, to the anode voltage supplied to the other motor drive valve, in which the amplifier impresses an alternating current voltage on the control grid of each motor drive valve which is of said frequency and is of one or the other of the anode voltage phases accordingly as the value of the control signal differs in one sense or in the opposite sense from the normal value, and in which a condenser by-passes said dropping resistor so that the potential produced thereacross, as the control signal attains its normal value, is substantially entirely due to a uni-directional current through said resistor.

3. Apparatus, as specified in claim 1, including a rectifier in the pulse generating circuit to prevent the application of negative potential surges to the control grid of the damping valve.

4. Apparatus, as specified in claim 1, in which the potential pulse generating circuit includes a resistor and a condenser connected to form a differentiating circuit.

5. In motor control apparatus of known type in which an alternating current signal of one phase or of the opposite phase is amplified in a multi-stage amplifier having an output circuit including the secondary winding of a transformer, the anode and cathode elements of two triodes, and a resonant circuit, with the ends of said secondary winding respectively connected to the anodes of the two triodes, with each cathode connected through said resonant circuit to the midpoint of said secondary winding, and with said resonant circuit including a condenser and in parallel therewith the control winding of a reversible alternating current motor which has a power winding arranged for connection to a source of alternating current of the same frequency as said signal and the current induced in said secondary winding, the current in said power winding leading or lagging the current in said secondary winding by approximately 90° according to the phase of said signal when alternating current of said frequency is flowing through said control winding, the improvement which comprises a potential dropping resistor connected in series with said cathodes and resonant circuit, a by-pass condenser connected in parallel with said resistor, an electronic damping valve normally biased to cutoff comprising an anode, a cathode, and a control grid and having an input circuit and an output circuit, a feed back connection from the output circuit of said amplifier to the input circuit of said damping valve, a connection from the damping valve output circuit to said multi-stage amplifier, and a second resistor and a second condenser connected in series with one another across said dropping resistor and actuated by a sudden increase in the direct current flow through said dropping resistor to impress a potential pulse on the control grid of said damping valve rendering the latter momentarily conductive.

6. In motor control apparatus of the type comprising a pair of motor drive valves, each of which has an anode, a cathode, a control grid, and an output circuit including the anode and cathode of the valve, the output circuits of the two valves including separate current supply connections to the anodes of the two valves and a common portion connected to the cathodes of the two valves, a motor, motor energizing circuit means connected to the output circuits of said valves for operation of said motor in one direction or in the opposite direction when the anode current of one of said valves is respectively larger or smaller than the anode current of the other valve, and an electronic voltage amplifier for amplifying a control signal and having an output circuit connected to the control grids of the two valves and operating to make one valve more or less conductive than the other when the value of the control signal differs in one sense or in the opposite sense from a normal value thereof, the two valves being similarly conductive when said control signal is of normal value, the improvement comprising a potential dropping resistor included in the common portion of the output circuits of the two valves and across which a maximum potential drop is attained when the two valves become similarly conductive, an electronic damping valve normally biased to cutoff comprising an anode, a cathode, and a control grid and having an input circuit and an output circuit including the anode and cathode of the damping valve, a phase reversing degenerative feed back connection including said damping valve connected between points in said apparatus at each of which the control signal is adapted to appear with a phase substantially identical to that of the control signal at the other point, whereby the control signal at one of said points is effective to reduce the magnitude of the control signal at the other of said points when said damping valve is made conductive, and a potential pulse generating circuit connected between the control grid of said damping valve and said resistor and operating in response to the increase in potential drop across said resistor to make said damping valve momentarily conductive as the control signal attains its normal value and the two motor drive valves become similarly conductive.

7. In motor control apparatus of the type comprising a pair of motor drive valves, each of which has an anode, a cathode, a control grid, and an output circuit including the anode and cathode of the valve, the output circuits of the two valves including separate current supply connections to the anodes of the two valves and a common portion connected to the cathodes of the two valves, a motor having a control winding across which a signal is adapted to appear when said motor is operating, said control winding being connected to the output circuits of said valves for operation of said motor in one direction or in the opposite direction when the anode current of one of said valves is respectively larger or smaller than the anode current of the other valve, and an electronic voltage amplifier for amplifying a control signal and having an output circuit connected to the control grids of the two valves and operating to make one valve more or less conductive than the other when the value of the control signal differs in one sense or in the opposite sense from a normal value thereof, the two valves being similarly conductive when said control signal is of normal value, the improvement comprising a potential dropping resistor included in the common portion of the output circuits of the two valves and across which a maximum potential drop is attained when the two valves become similarly conductive, an electronic damping valve normally biased to cutoff comprising an anode, a cathode, and a control grid and having an input circuit and an output circuit including the anode and cathode of the damping valve, a feed back connection from said motor control winding to the input circuit of said damping valve, a second feed back connection from the damping valve output circuit to a point in said amplifier at which said control signal is adapted to appear with a phase which is the same as that of said signal appearing across said motor control winding, whereby, when said damping valve is made conductive, said feed back connections are operative to apply the signal appearing across said control winding to said amplifier point in phase opposition to the control signal at said point in order to effect a reduction in the magnitude of the last mentioned signal, and a potential pulse generating circuit connected between the control grid of said damping valve and said resistor and operating in response to the increase in potential drop across said resistor to make said damping valve momentarily conductive as the control signal attains its normal value and the two motor drive valves become similarly conductive.

LEONARD STANTON.

No references cited.